(12) United States Patent
Bucklew et al.

(10) Patent No.: US 12,395,053 B1
(45) Date of Patent: Aug. 19, 2025

(54) HIGH VOLTAGE CONDUCTOR AND METHODS OF FABRICATION

(71) Applicant: National Electric Coil Company, L.P., Columbus, OH (US)

(72) Inventors: Daniel Steward Bucklew, Laguna Vista, TX (US); Aleksandr Iosifovich Khazanov, Rancho Viejo, TX (US); Juan Pablo Correa Linares, Brownsville, TX (US)

(73) Assignee: National Electric Coil Company, L.P., Columbus, OH (US)

( * ) Notice: Subject to any disclaimer, the term of this patent is extended or adjusted under 35 U.S.C. 154(b) by 0 days.

(21) Appl. No.: 19/049,598

(22) Filed: Feb. 10, 2025

Related U.S. Application Data (60) Provisional application No. 63/695,786, filed on Sep. 17, 2024.

(51) Int. Cl.
  *H02K 3/40* (2006.01)
  *H02K 15/122* (2025.01)
  *H02K 3/24* (2006.01)
  *H02K 7/18* (2006.01)

(52) U.S. Cl.
  CPC ............. *H02K 15/122* (2025.01); *H02K 3/24* (2013.01); *H02K 3/40* (2013.01); *H02K 7/1823* (2013.01)

(58) Field of Classification Search
  CPC ........................................................ H02K 3/40
  See application file for complete search history.

(56) References Cited

U.S. PATENT DOCUMENTS

| | | |
|---|---|---|
| 2,656,290 A | 10/1953 | Berberich et al. |
| 2,917,570 A * | 12/1959 | Wolff ................ H01B 3/04 174/120 SR |
| 2,970,936 A | 2/1961 | Richardson |
| 3,050,787 A * | 8/1962 | Richardson et al. .... H01B 3/30 264/102 |
| 3,662,199 A | 5/1972 | Anderson et al. |
| 3,823,334 A | 7/1974 | Philosfsky et al. |
| 3,891,880 A * | 6/1975 | Britsch ................ H01F 5/06 442/212 |
| 4,001,616 A | 1/1977 | Lonseth et al. |
| 4,370,188 A | 1/1983 | Otty |
| 4,427,740 A | 1/1984 | Stackhouse et al. |
| 5,925,944 A | 7/1999 | Emery et al. |
| 6,559,384 B1 | 5/2003 | Angell et al. |
| 6,836,204 B2 | 12/2004 | Reid et al. |
| 7,427,712 B2 | 9/2008 | Emery |
| 10,992,199 B2 | 4/2021 | Nikrant et al. |
| 11,979,070 B2 | 5/2024 | Reid et al. |
| 2014/0300241 A1 | 10/2014 | Reid et al. |
| 2024/0258862 A1 | 8/2024 | Reid et al. |

FOREIGN PATENT DOCUMENTS

| | | |
|---|---|---|
| BG | 2808 U1 * | 10/2017 |
| JP | 10-58545 A * | 3/1998 |
| JP | 2009-268274 A * | 11/2009 |

* cited by examiner

*Primary Examiner* — Jeffry H Aftergut
(74) *Attorney, Agent, or Firm* — Rock IP, PLLC (57) ABSTRACT

A method of fabricating an HVRM conductor is disclosed. The method may include wrapping a conductor bundle with a resin-rich mica tape to form a wrapped bundle and placing the wrapped bundle in a sleeve comprising a liquid-impermeable material to form a covered bundle. The method may also include at least partially submerging the covered bundle in a vat of liquid, and thereafter placing the conductor bundle in a press.

20 Claims, 5 Drawing Sheets

HIGH VOLTAGE CONDUCTOR AND METHODS OF FABRICATION

TECHNICAL FIELD

The present disclosure relates generally to a conductor for an HVRM and, more particularly, to a conductor for a High Voltage Rotating Machine and to methods of fabricating the conductor.

BACKGROUND

A High Voltage Rotating Machine ("HVRM") is a type of rotating machine that operates at voltages over 1,000 volts. HVRMs may operate as generators, motors, synchronous condensers, and the like. Generators convert rotating kinetic energy (e.g., from a rotating prime mover) to electrical power. Motors convert electrical power to rotating kinetic energy (e.g., for an external rotating load). Synchronous condensers provide reactive power compensation to maintain electrical grid stability and reliability.

A conventional HVRM includes a rotor that is rotationally mounted inside of stator. The rotor is the rotating component of the HVRM, while the stator is stationary. Both the rotor and the stator include conductors known as windings. In general, the windings are formed from copper that is wrapped around or imbedded within a magnetic iron core. To avoid electrical contact between the windings and between the windings and the cores, the conductors are provided with layers of insulation known as conductor insulation.

An outer wall of the insulation surrounding a conductor is known as a ground wall. The typical ground wall of an HVRM conductor consists of spiral-wrapped overlapping layers of tape. One such tape is known in the industry as a mica-tape and includes a backing (e.g., of synthetic fiber or glass reinforced cloth), at least one ply of mica paper, and a resin binder. Mica-tape is available as a resin-rich tape or a resin-poor or dry tape, depending on an amount of the resin binder in the tape. A resin-rich tape includes an amount of resin binder in the tape that is about equal to or in excess of that required to achieve a final desired composition of resin and mica in a consolidated ground wall. A resin-poor or dry tape requires the addition of resin to achieve the final desired composition.

Historically, HVRM conductors have been fabricated using multiple different processes. Some of these processes utilize a resin-poor or dry mica tape, while others of these processes utilize a resin-rich mica tape.

An example fabrication process utilizing a resin-poor mica tape is disclosed in U.S. Pat. No. 2,656,290 that issued to Berberich on Oct. 20, 1953 (the '290 patent). In this example, a conductor is wrapped in a mica tape having a liquid binder not exceeding 25% of the weight of the tape. The wrapped conductor is heated to a temperature less than 175° C., and a placed into a vacuum chamber to remove moisture, air, and other volatiles. The vacuum-treated conductor is thereafter cooled to below 50° C. and the vacuum chamber is flooded with a polymerizable composition liquid resin (e.g., an epoxy anhydride or polyester resin with monostyrene) with atmospheric or higher pressure applied to the surface of the liquid composition to impregnate the wrapped conductor. Heat and pressure are then applied to the impregnated conductor via a dynamic press to shape the conductor, to remove excess composition, and to polymerize the composition.

Although perhaps suitable for some applications, the example process of the '290 patent may be slow. That is, significant time may be required during chamber evacuation and subsequent pressurization. Even more time is thereafter required for heating and pressing of the impregnated conductor. Further, resins that perform well for these impregnation processes may also have a low glass transition temperature and perform poorly under highly cyclical thermal loading conditions.

In some instances, batch processing may help to reduce the time associated with the process described in the '290 patent. For example, rather than processing a single conductor at a time, multiple conductors may be wound with tape and loaded into a corresponding core prior to the evacuation and impregnation steps. The entire assembly may then be heated and cured together. While following this process may reduce an overall amount of time to produce a core/winding assembly, it may also require expensive equipment and large amounts of composition that can be difficult to maintain at an optimum quality level. Such a process may also create difficulties in aftermarket support, as individual conductors become glued into the core and require extra time, effort and tooling to replace. In some situations, the core/winding assembly may need to be returned to the factory setting for repair, resulting in transportation costs and downtime.

When fabricating a conductor using a resin-rich tape, the impregnation of the tape is part of the manufacturing process. Typical fabrication includes covering the resin-rich tape-wrapped conductor with a sacrificial covering that is permeable to the resin in the mica tape. Heat and pressure are applied to consolidate, shape, and cure the ground wall insulation. Excess resin is pressed out of the tape through the sacrificial covering prior to curing. The sacrificial covering may allow for easy extraction from profile tooling. Because impregnation is not required, a total amount of time to process the conductor may be reduced.

In some applications, a dynamic press may be used to consolidate and shape the ground wall insulation. In some instances, the heat required to cure the resin may be applied within the press. In these applications, care must be taken such that consolidation of the ground wall and shaping of the surface geometry happens only after the resin in the tape liquefies and prior to gelling. This may be difficult to achieve with thicker ground walls and larger conductor cross-sections that behave as heatsinks. That is, a temperature differential may exist due to heat from the press being required to pass from an outer surface of the ground wall all the way to the center of the conductor. This temperature differential could cause the resin near the outer surface to gel before the resin at the inner layers has sufficiently liquified. When this happens, moisture, air, and other volatiles may become trapped within the inner layers, resulting in low and/or inconsistent insulating qualities.

A final example of a resin rich tank process is disclosed in U.S. Pat. No. 3,050,787 that issued to Richardson on Aug. 28, 1962 (the '787 patent). In this process, a tape-wrapped stator bar is placed inside a constrictable mold, enveloped in a sacrificial covering, and set inside a pressure-tight tank. The tank is then evacuated and heated. Thereafter, molten asphalt is pumped into the tank, such that a uniform and elevated hydraulic pressure is applied to the stator bar. The stator bar is left in the tank for five hours, until a thermosetting resin in the tape cures.

Although the combination of the heated mold and hydraulic pressure described in the '787 patent may produce a stator bar having improved qualities, it may still be less than optimal. For example, the empty heated tank without the molten asphalt (i.e., heated via convection alone) may be unable to adequately warm the windings inside the stator bar and eliminate any temperature differential within a reasonable amount of time. Accordingly, it may be necessary to use a low-reactivity resin so that the heat from the asphalt sufficiently penetrates the bar with enough time for the elevated pressure to consolidate and mold the ground wall before polymerization of the resin occurs. This may require long processing cycles for full cure of the resin that can only be offset with the problematic batch processing described above.

In addition, asphalt may also be difficult to work with, hard to clean, expensive, hazardous to the environment, and/or have low conduction properties. This may result in expensive tooling and long delays for cleaning. The high temperatures associated with molten asphalt may also be capable of deforming the conductor.

The disclosed conductor and methods of fabrication are directed at overcoming one or more of the problems set forth above and/or other issues in the prior art.

SUMMARY

In one aspect, the present disclosure is directed to a method of fabricating an HVRM conductor. The method may include wrapping a conductor bundle with a resin-rich mica tape to form a wrapped bundle, and placing the wrapped bundle in a sleeve comprising a liquid-impermeable material to form a covered bundle. The method may also include at least partially submerging the covered bundle in a vat of liquid, and thereafter placing the conductor bundle in a press.

In another aspect, the present disclosure is directed to another method of fabricating an HVRM conductor. This method may include spiral wrapping a conductor bundle with a resin-rich mica tape to form a wrapped bundle and placing the wrapped bundle in a sleeve comprising a liquid-impermeable material to form a covered bundle. The method may also include sealing any open end of the sleeve, evacuating the sleeve, and thereafter fully submerging the covered bundle in a vat of water heated to about 60-100° C. Thereafter, the method may further include placing the conductor bundle in a press heated to about 130-180° C. to shape the conductor bundle and cure a resin in the resin-rich mica tape.

In another aspect, the present disclosure is directed to another method of fabricating an HVRM conductor. This method may include spiral wrapping a conductor bundle with a resin-rich mica tape to form a wrapped bundle and placing the wrapped bundle in a sleeve comprising a liquid-impermeable material to form a covered bundle. The method may also include sealing any open end of the sleeve, evacuating the sleeve, and thereafter fully submerging the covered bundle in a vat of water heated to about 60-100° C. The method may further include pressurizing the vat of water in an autoclave after the covered bundle has been fully submerged. Thereafter, the method may further include placing the conductor bundle in a press heated to about 130-180° C. to shape the conductor bundle and cure a resin in the resin-rich mica tape.

DETAILED DESCRIPTION

Figure 1:
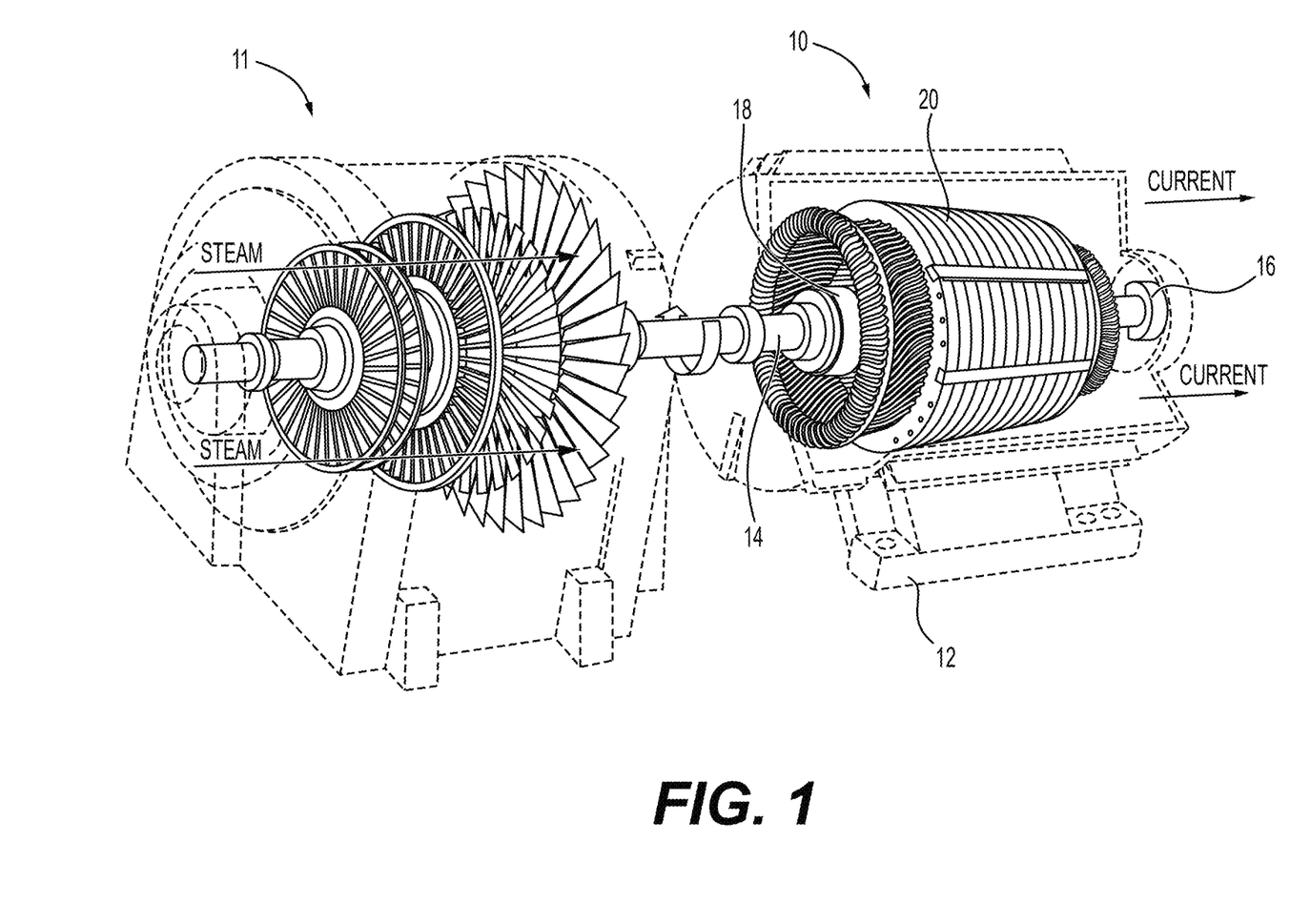
FIG. 1 is a diagrammatic illustration of an exemplary disclosed HVRM.

FIG. 1 illustrates an exemplary HVRM 10 functioning as a generator. In this example, HVRM is mechanically driven by gas turbine 11 (e.g. a turbine driven by a flow of pressurized fluid such as steam from a nuclear reactor or other heat source) to produce electricity. It should be noted, however, that HVRM 10 could alternatively function as a motor to mechanically drive a compressor or selectively function as both a generator and a motor. It should also be noted that, while a horizontal orientation of HVRM 10 is shown in FIG. 1, vertical and other orientations are also envisioned. Other example applications of HVRM 10 include hydroelectric generators, compressor motors, extruder motors, fan motors, and synchronous condensers.

Regardless of the orientation or intended application, HVRM 10 may include, among other things, a housing 12, a shaft 14 rotatably supported within housing 12 by one or more bearings 16, a rotor 18 operatively coupled with shaft 14, and a stator 20 that annularly surrounds rotor 18. When shaft 14 is mechanically driven to rotate within bearings 16 (e.g., by a turbine 11 also connected to shaft 14), rotor 18 may likewise rotate and interact with a stationary magnetic field of stator 20 to produce electricity. Conversely, when current is passed through stator 20, the resulting magnetic field may cause rotor 18 and connected shaft 14 to rotate. Stator 20 may be fixed to housing 12 and include components that produce the stationary magnetic field described above. It is contemplated that HVRM 10 may contain additional or different components than those depicted in FIG. 1 such as, for example, bushings, circuit rings. phase rings, buss work, and/or other components known in the art.

Figure 2A:
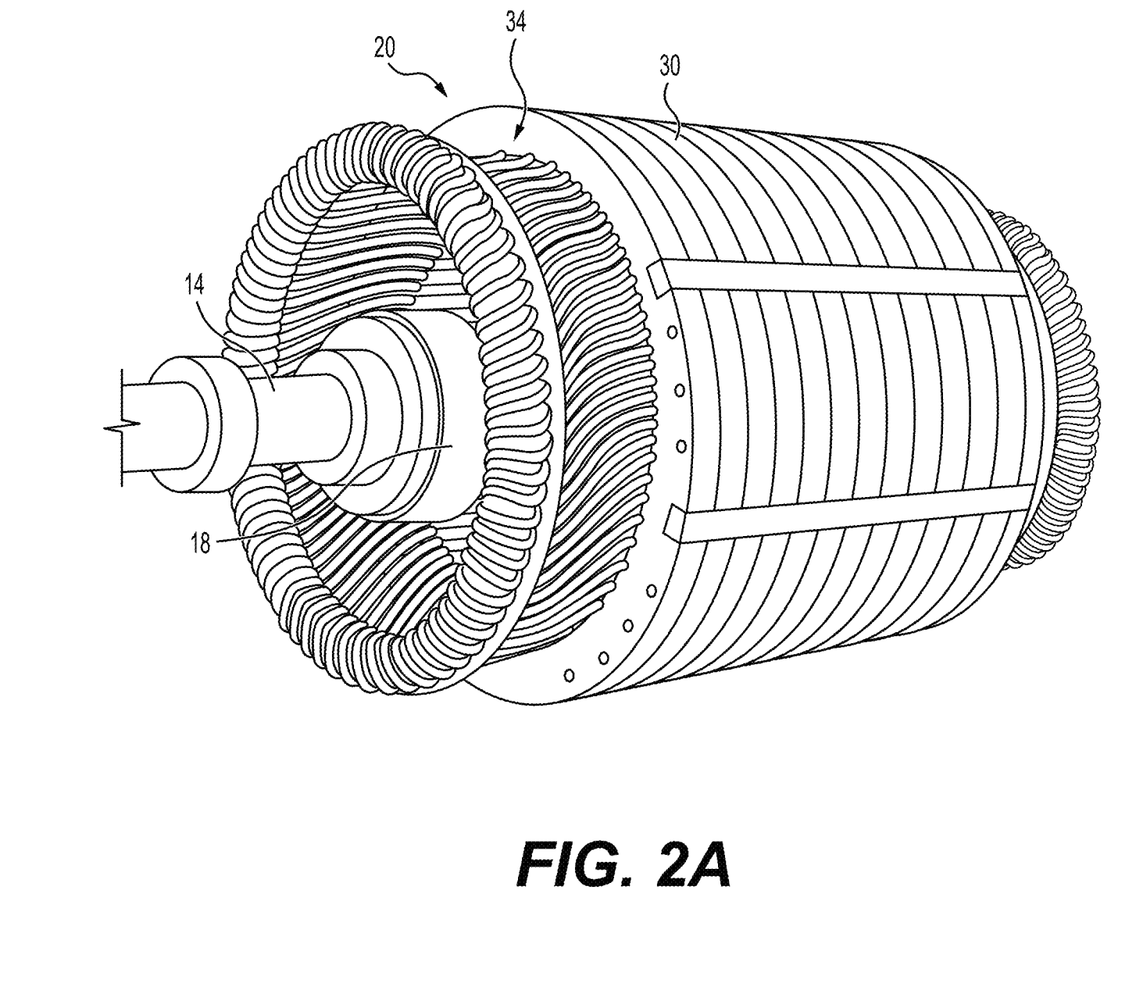
FIG. 2A is an isometric illustration of an exemplary rotor and stator that may form a portion of the HVRM of FIG. 1.
Figure 2B:
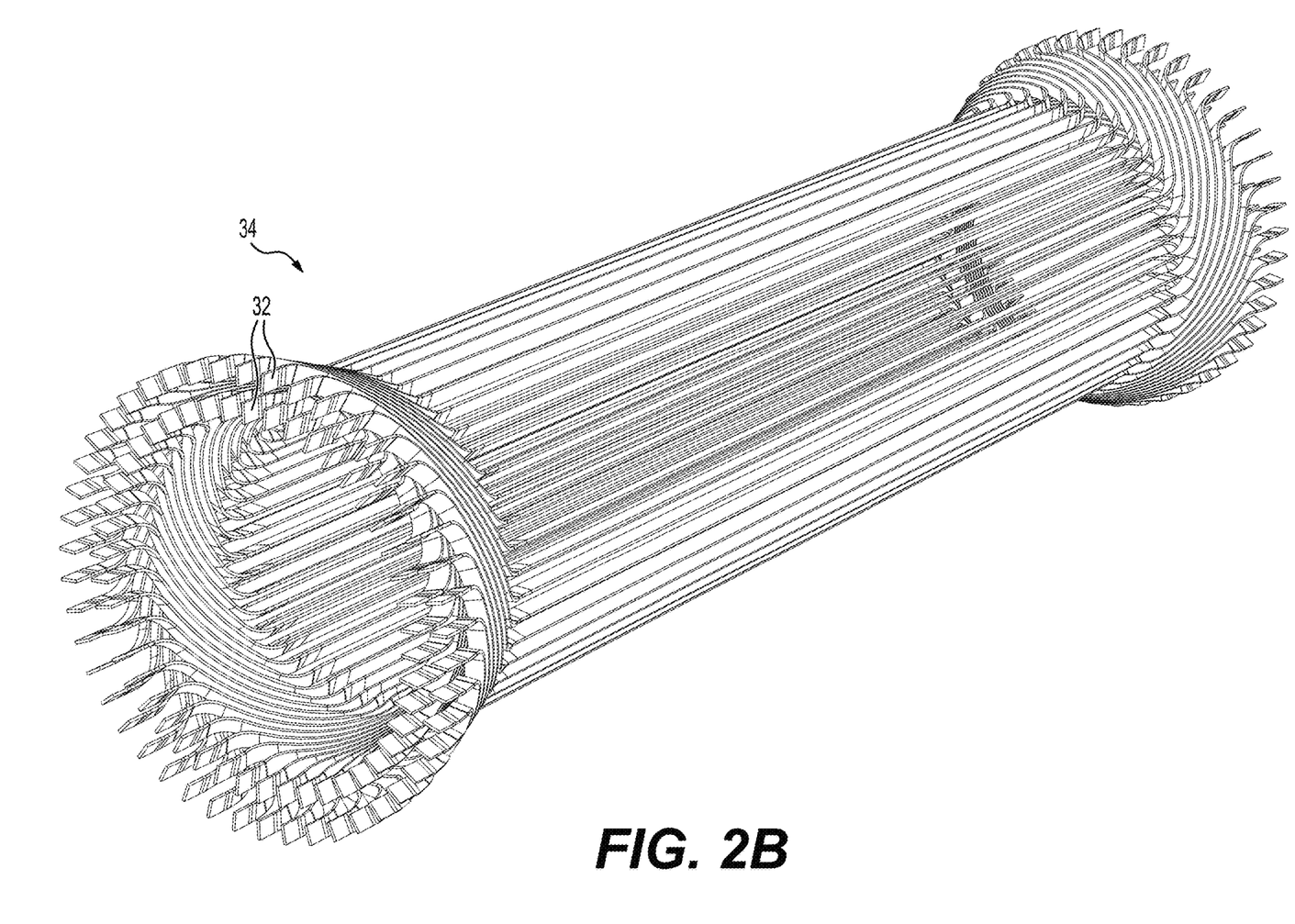
FIG. 2B is an isometric illustration of an exemplary stator winding that may form a portion of the stator of FIG. 2A.

As shown in FIGS. 2A and 2B, stator 20 may include a core 30 and a plurality of coils 32 arranged to form a stator winding 34. In one embodiment, rotor 18 may include a core (not shown) having a number of poles that project radially outward from shaft 14 and that are each wound with an exciting coil (not shown).

Figure 3A:
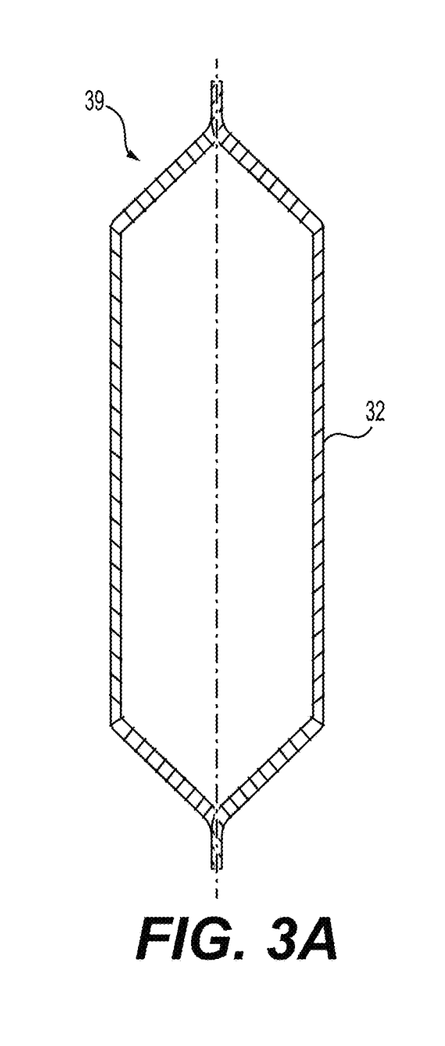
FIGS. 3A and 3B are isometric illustrations of an exemplary conductor that may form a portion of the stator of FIG. 2.
Figure 3B:
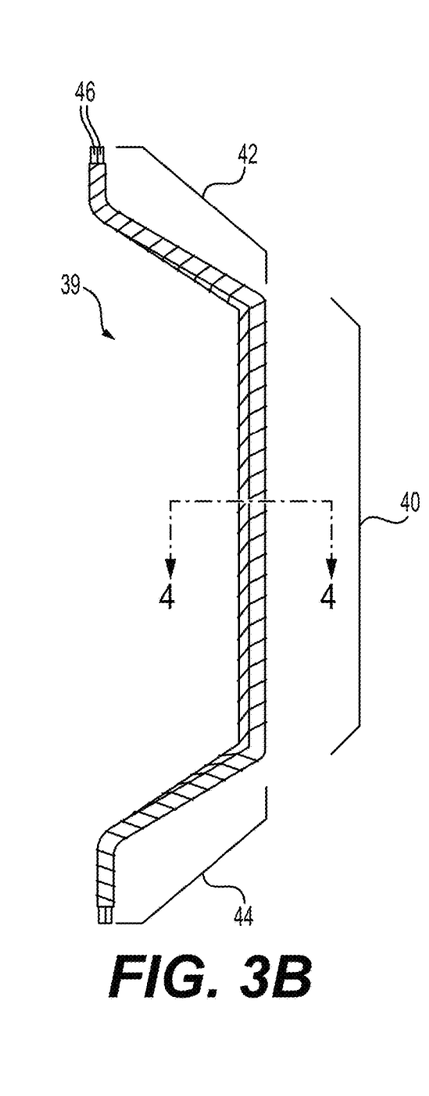
Figure 4:
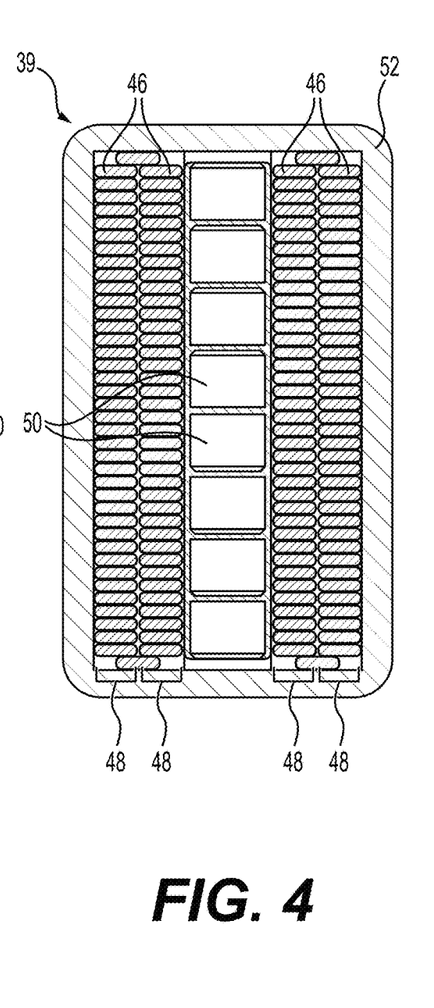
FIG. 4 is a cross-sectional illustration of the exemplary conductor of FIG. 3.

For the purposes of this disclosure, a coil 32 comprises a grouping of copper wires or strands arranged generally parallel to each other and that extend along an axial length of the corresponding core 30. A complete loop around core 30 by coil 32 is considered a turn of the coil. An example turn of coil 32 is depicted in FIG. 3A. One-half turn of a coil may be considered a bar. An example bar is illustrated in FIG. 3B, and a cross-section of the bar is illustrated in FIG. 4. Each HVRM 10 may include either multi-turn coils or twice as many ½ turn coils or bars associated core 30, depending on the application. Accordingly, the term "conductor" 39 will be used in this disclosure to generically refer to both a full-turn and a half-turn (i.e., a bar) of a coil.

As shown in FIG. 3B, conductor 39 may include a slot portion 40, a first end-turn 42, and a second end-turn 44. Slot portion 40 may be generally straight, and first and second end-turns 42, 44 may be bent to extend away from opposing ends of slot portion 40 at oblique angles. When conductor 39 is assembled into a corresponding slot of core 32 (referring to FIG. 2), first and second end-turns 42, 44 may both be oriented radially outward away from rotor 18.

As shown in FIG. 4, each conductor 39 may include any number of copper wires or strands 46 arranged into one or more adjacent stacks 48. Each individual strand 46, as well as each stack 48 of strands, may have a generally rectangular cross-section. In the disclosed embodiment, four stacks 48 of strands 46 are arranged into a left-hand pairing and a right-hand pairing (i.e., left and right relative to the perspective of FIG. 4). Each strand 46 may be separated from an adjacent strand 46 within the same stack 48 by electrical insulation (e.g., by a double glass strand insulation). Likewise, each stack 48 within a given pairing may be separated from another stack 48 other by additional insulation (e.g., by a B-stage glass separator, such as a polyester resin-treated glass cloth). In some embodiments, one or more ventilation tubes (e.g., sleeves fabricated from a metal alloy) 50 may be located between the pairings of stacks 48 to aid in cooling conductor 39, and additional insulating separators may line the borders between the pairings and the tubes. Stacks 48, tubes 50, and associated insulation (a.k.a., conductor insulation) may be packed together into a generally rectangular conductor bundle.

It should be noted that, while the conductor bundle depicted in FIG. 4 shows an example arrangement of stacks 48, tubes 50, and associated conductor insulation, other configurations are also possible. For example, it may be possible to omit tubes 50 and/or replace tubes 50 with other forms of cooling structures (e.g., water-cooled strands). Any configuration of stacks 48, tubes 50, insulation, and/or other conventional features within the conductor bundle are envisioned.

The conductor bundle may be encapsulated by way of one or more layers of tape 52. Tape 52, in addition to containing the other components of conductor 39, tape 52 may also function as a ground wall jacket of insulation.

Tape 52 may include, among other things, one or more layers of a nonconductive inorganic fabric (e.g., a glass fabric), one or more layers of mica paper, and a resin (e.g., a liquid thermally curable resin). The fabric may function simply as a backing, while the mica paper may function primarily as a dielectric. The resin may at least partially coat or fully saturate the other layers of the tape and function as a binder. In some applications, the resin is considered a highly reactive resin having thermal-cycle endurance properties (e.g., a novolac epoxy resin). In the disclosed applications, tape 52 is considered a resin-rich tape (e.g., having 37-43% or more resin-to-mica content and about 120 g of resin per square meter of tape). Each layer of tape 59 may have a thickness of about 0.13-0.25 mm and a width of about 20-25 mm. Many different types and brands of tapes are commercially available and known widely as "mica tapes." In some embodiments, conductor 39 may be wrapped with a resin-rich tape, as will be described in more detail in the following section.

The resin used in mica tapes may be considered at an A-stage when no or little cross-linking (a.k.a., polymerizing) between polymers has occurred. The resin may be considered a liquid when at the A-stage. When the resin is at a B-stage, some cross-linking may have started and a viscosity of the resin may have increased, when compared to the A-stage; however, a B-stage resin may not be considered as cured. When the resin is at a C-stage, cross-linking may be nearly or fully complete and the resin may be cured and a solid. In some applications of the present disclosure, the resin in tape 52 used to fabricate conductor 39 may initially be near or at the B-stage, such that handling of tape 52 and wrapping of the bundle is easier and cleaner. As such, the tape may need to be kept from heating past a cure temperature prior to fabrication, such that cross-linking does not proceed past the B-stage prior to completion of the fabrication process.

Conductor 39, as fabricated via the disclosed methods may have a finished length of about 0.6-12.2 m and a cross-section of about 0.035-25 cm$^2$ or more. A total thickness of tape 59 making up the ground wall may be about 0.3-7.0 mm.

Figure 5:
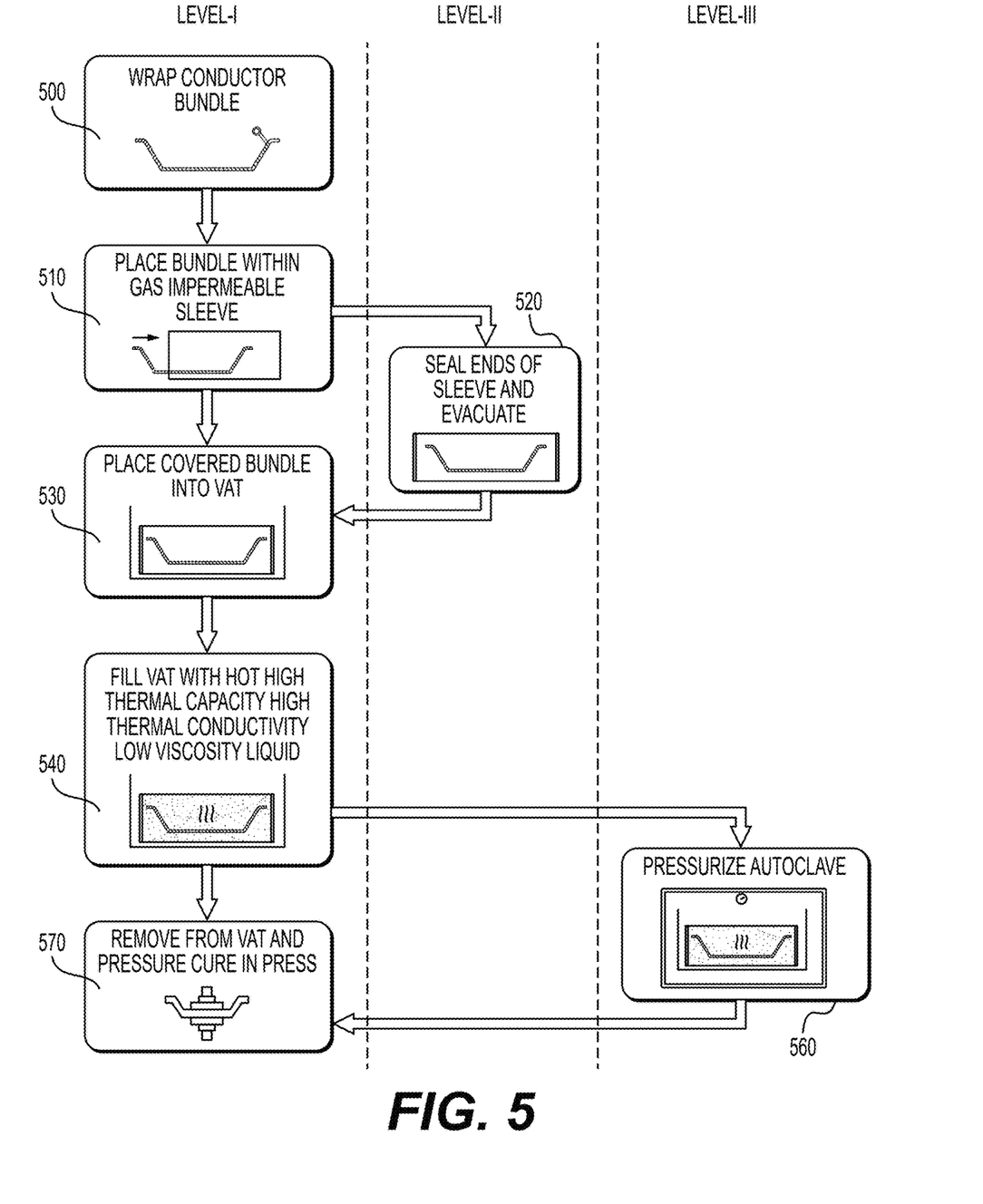
FIG. 5 is a flowchart depicting an exemplary method that may be used to fabricate the exemplary conductor of FIGS. 3 and 4.

FIG. 5 illustrates a flowchart that corresponds to exemplary methods of fabricating conductor 39. FIG. 5 will be described in detail in the following section to further illustrate the disclosed concepts.

INDUSTRIAL APPLICABILITY

The disclosed conductor and fabrication methods find potential application in any HVRM. However, the disclosed conductor and fabrication methods find particular application in high-voltage machines, where quality, dimensional accuracy, and low-cost are important factors. Methods of fabricating conductor 39 will now be described in detail, with reference to FIG. 5.

For the purposes of this disclosure, the process of packing stacks 48, tubes 50, and associated insulation into a conductor bundle will be omitted. Many processes are known in the art for fabricating such bundles, and any or all of these processes are considered within the purview of this disclosure.

As shown in FIG. 5, after fabrication of an acceptable conductor bundle of stacks 48, tubes 50 and associated insulation has been completed, the conductor bundle may be wrapped with tape 52 (Step 500) to form a wrapped bundle. That is, any commercially available resin-rich mica tape may be wrapped around the bundle in spiral fashion by hand and/or by an automated or semi-automated tool (e.g., a computer controlled wrapping machine or robot). Each spiral of tape 52 may overlap a preceding spiral by about 0-½ (e.g., about ⅓) of a width of the tape using a spiral progression angle of about 3-5° (e.g., about 4°). A tension of about 20-120N may be maintained in tape 59 during wrapping, depending on a width of the tape (e.g., with higher tensions utilized for wider tapes).

Any number of (e.g., about 2-30) layers of spiral wound tape 52 may be applied to the bundle. In some embodiments, about 20-80V of insulating properties may be obtained per mm of ground wall thickness.

In some embodiments, tape 52 may be warmed before wrapping (i.e., preheated), if desired. For example, the tape may be heated to about 20-80° C. Such warming may make the tape more flexible, easier to work with, and less likely to crack. It should be noted, however, that preheating is not required.

After wrapping with tape 52, one or more sacrificial materials (e.g., a release-coated tape and/or release film) may be applied to the wrapping. These sacrificial materials may help to isolate the ground wall from other materials used in the process of FIG. 5. To enable maintaining of dimensional tolerances in the slot portion of conductor 39, a thickness of any applied sacrificial tape may be kept relatively thin (e.g., 0.005-0.010 mm) and laid down in a precise single half-lapped spiral fashion. The sacrificial tape may allow the exiting of gas and the bleeding-through of liquefied resin. Additional layers of a polyester release film (e.g., about 0.05-0.07 mm thick) may be applied to provide additional detachment from tooling and/or to provide additional dimensional control over the sharpness of corners in the final and cured cross-section of conductor 39.

After the conductor bundle is suitably wrapped with tape 52, conductor 39 may be placed inside of a liquid-impermeable sleeve (Step 510). Again, this step may be completed manually, automatically, or semi-automatically, as desired. The sleeve may be fabricated from a material that is pliable and mechanically strong. In some applications, the sleeve material may be capable of self-fusion when heated, such that any sealing of the sleeve may be maintained. Example sleeve materials include, among other things, plastics such as nylon, polypropylene, polyethylene, and polyamide.

In some applications, one or more ends of the sleeve may be left open to the atmosphere. In other applications, however, the ends may be sealed such that the resulting bag can be evacuated (Step 520). In one example, evacuating the bag includes applying a vacuum pressure of up to about 500 microns that produces a pressure of about 10-20 psi (e.g., about 15 psi) acting on the conductor 39. This additional pressure may help to consolidate the conductor bundle during subsequent heating, resulting in a higher-quality conductor.

Following Steps 510 or 520, the covered bundle (sealed or unsealed) may be placed into a vat (Step 530) in preparation for submersion in a heated liquid. When the sleeve has one or two open ends, these ends may be held above the surface level of the liquid such that the liquid does not enter the sleeve and wet the bundle.

The vat may then be filled with the heated liquid (Step 540). The liquid may be any heat conducting fluid that is of suitably low viscosity within the anticipated operating temperature range of the vat and that has high thermal capacitance and conductivity. It has been determined that a viscosity of about 0.4-10.0 centipoise (e.g., about 1-1.1 centipoise) within an operating range of about 20-100° C. (e.g., about 60-100° C. or about 70-100° C.), a thermal capacity of 2000-5000 J/kgK (e.g., about 4184 J/kgK), and a thermal conductivity of about 0.25-0.65 W/mK (e.g., about 0.609 W/mK) provide desired results within an acceptable amount of processing time. In the disclosed example, the liquid is primarily water (e.g., where the concentration of water is higher than other additives). Water has a thermal capacity about equal to its conductivity and is better performing than other available liquids (e.g., about 20% greater conductivity and about 200-500% greater thermal capacity than asphalt). However, in some embodiments, other liquids or mix of liquid that fall within the desired centipoise, capacity, and conductivity ranges at the operating temperature range may be used (e.g., ethanol, ethylene glycol, propylene glycol).

Submerging conductor 39 in the heated liquid may function to warm tape 52 and strands 46. Warming of tape 52 may cause the resin therein to soften (e.g., to liquefy), allowing a pressure of the liquid on the submerged conductor 39 to mold tape 52 around the bundle. This pressure may act to press out voids and laminar inclusions trapped in the tape and/or bundle. By warming strands 46 at the same time as tape 52, minimal (e.g., substantially no) thermal gradient may exist throughout the cross-section of the bundle, resulting in a desired and consistent porosity (e.g., voids or inclusions smaller than about 0.0004" or about zero voids or inclusions) throughout the cross-section.

In the disclosed example, submersion of conductor 39 in heated water for about 30-60 min. was shown to be sufficient for desired results. That is, after this time in the hot water, enough heat may be delivered to the center of the copper strands 46 so that the strands do not become an excess heat sink during final sizing and curing of the mica-resin composite ground wall. Additionally, this time of heating may help ensure that the resin easily flows within the bundle and the ground wall is flexible and pliable enough to consolidate the ground wall hydrostatically.

For Step 540 to be successful, outgassing may need to be completed before gelling of the resin within tape 52 occurs or becomes significant (e.g., greater than about 0.01%, 0.1%, 0.25%, 0.5%, 1.5%, or 2%). Use of a liquid other than water for heating conductor 39 could require longer submersion times and/or hotter temperatures to achieve similar results, and these longer times and/or hotter temperatures may exceed gelling thresholds prescribed for the resin.

As heat from the liquid is absorbed by conductor 39 or otherwise dissipated into the surrounding environment, a temperature of the liquid may gradually decrease. In some applications, additional heat may be added to help ensure that the temperature of the liquid remains within the desired range.

It should be noted that, while placement of the covered bundle into the vat is disclosed as occurring prior to filling of the vat with the hot liquid, this may not always be the case. For example, the vat could first be filled and thereafter the covered bundle submerged into the vat, if desired. It is also contemplated that the sleeve containing conductor 39 could be evacuated and sealed without immediate submersion in the vat of heated liquid, if desired. That is, the sealed conductor 39 could be staged indefinitely for later processing, as long as conductor 39 is maintained moisture-free and dry under vacuum conditions.

In some applications, the addition of pressure to the vat containing the heated liquid and the sleeved conduit may be selectively increased. For example, the vat may be inside of and/or form an integral portion of an autoclave. In these applications, the autoclave may then be selectively activated to increase the pressure of the water being exerted through the sleeve onto conductor 39 (Step 560). In one example, the pressure inside the vat may be increased up to about 50 psi or more (e.g., up to about 100 psi or more). This increased pressure, combined with the pressure of the liquid and/or the vacuum inside the sleeve, may further help consolidate the conduit bundle. It has been found that a thickness of the conductor ground wall jacket may decrease by about 30-50% when autoclave pressure is combined with the water and vacuum pressures during fabrication of conductor 39.

When evacuation of the sleeved conductor occurs outside of the vat and/or outside of the autoclave, the processing cycle times (e.g., the times that the vat and/or autoclave are occupied) may be shortened. Accordingly, the time expended inside the vat and/or the autoclave may be dependent only on the amount of time required to heat or consolidate, and not on an amount of time required to evacuate the sealed sleeve. In one example, the time required to adequately pressurize conductor 39 inside of the autoclave was less than 3.5 hrs. This may not only reduce a cost of conductor fabrication, but also free the vat and/or the autoclave for processing of other conductors.

After pressurization of the vat, the sleeve applied to conductor 39 at Step 510 may be removed, and conductor 39 (e.g., at least slot portion 40 of conductor 39) may be placed into a press and cured (Step 570). The press may be dynamic (i.e., having portions that are moveable by external actuators to press on conductor 39) and be used to shape conductor 39 to final dimensional specifications. In some embodiments, the press may include one or more smooth internal surfaces equipped with a heater that functions to cure the resin in tape 52 (e.g., to push the resin from the B-stage to the C-stage). That is, curing may be initiated and/or completed by further elevating the temperature of the resin (e.g., above the temperature imparted by submersion in the hot liquid). In one example, the resin is heated in the press to about 130-180° C. (e.g., 160° C.) and held at that temperature within the press for at least a threshold amount of time (e.g., about 1.5-2 hrs.).

For reasons similar to those discussed above, because shaping and curing of the conductor may be performed outside of the autoclave, the pressurization cycle time may be shortened. That is, the timing expended inside the autoclave may be dependent only on an amount of time required for consolidation, and not on an amount of time required to shape conductor 39 or cure the resin. This may not only reduce a cost of conductor fabrication, but also free the autoclave for other purposes.

The disclosed methods may produce a conductor having a ground wall jacket with a low-dissipation factor and a high-glass transition temperature, because the conductor may be nearly or completely void free and the layers of tape 52 may be well consolidated. In addition, high-dimensional tolerances may be obtained via short fabrication cycles, without the need for significant post processing (e.g., sanding and/or tailoring). Further, the use of hydraulic pressures for consolidation purposes may help with uniformity throughout both slot portion 40 and end-turns 42, 44.

It is contemplated that different combinations of steps may be selectively performed to achieve different quality levels of conductor 39, if desired. For example, covering the conductor bundle with an open-ended sleeve (i.e., without evacuation—see FIG. 5), may produce a level-I conductor. In contrast, utilizing a vacuum-sealed sleeve may produce a level-II conductor. A highest quality conductor (e.g., a level-III) conductor may be fabricated by combining vacuum sealing with positive autoclave pressures.

It should be noted that, while fabrication of a single conduit has been described in detail above, it is contemplated that batch fabrication is also envisioned. For example, tooling may be created that holds more than one sealed conduit inside the vat and/or more than one vat inside the autoclave. In this example, the tooling may be fully loaded prior submersion and/or prior to placement in the autoclave. This may increase throughput and reduce active time in the vat and/or autoclave. Additionally, or alternatively, the press may have multiple cavities to simultaneously accept and process multiple conduits.

The present disclosure provides novel processes for manufacturing the ground wall of an HVRM conductor. These processes provide for high consolidation of the associated insulation, high dimensional accuracy in both the slot portions and end turns, and desired curing required of high-voltage coils and bars. The disclosed processes achieve low-cycle times and produces conductors suitable for applications up to or exceeding 30 KV.

It will be apparent to those skilled in the art that various modifications and variations can be made to the HVRM of the present disclosure. It is intended that the specification and examples be considered as exemplary only, with a true scope of the disclosure being indicated by the following claims and their equivalents.

What is claimed is:

1. A method of fabricating an HVRM conductor, comprising:
    wrapping a conductor bundle with a resin-rich mica tape to form a wrapped bundle;
    placing the wrapped bundle in a sleeve comprising a liquid-impermeable material to form a covered bundle;
    at least partially submerging the covered bundle in a vat of liquid; and
    thereafter placing the conductor bundle in a press.

2. The method of claim 1, wherein the resin-rich mica tape is a high-reactivity resin tape.

3. The method of claim 1, further including heating the liquid to about 60-100° C.

4. The method of claim 3, wherein the liquid is primarily water.

5. The method of claim 3, further including sealing any open ends of the sleeve.

6. The method of claim 5, further including evacuating the sleeve prior to at least partially submerging the covered bundle.

7. The method of claim 5, wherein at least partially submerging includes fully submerging the covered bundle in the vat of liquid.

8. The method of claim 5, further including pressurizing the vat of liquid after the covered bundle has been at least partially submerged in the vat of liquid.

9. The method of claim 8, wherein:
    the press is heated and dynamic; and
    the method further includes shaping the conductor bundle and curing a resin in the resin-rich mica tape within the heated and dynamic press.

10. The method of claim 8, wherein pressurizing the vat of liquid includes pressurizing the vat of liquid inside of an autoclave.

11. The method of claim 8, wherein placing the conductor bundle in the press includes placing the conductor bundle in the press after removing the covered bundle from the vat of liquid and the autoclave and after removing the sleeve from the covered bundle.

12. The method of claim 1, further including pressurizing the vat of liquid after the covered bundle has been at least partially submerged in the vat of liquid.

13. The method of claim 12, wherein:
    the press is heated and dynamic; and
    the method further includes shaping the conductor bundle and curing a resin in the resin-rich mica tape within the heated and dynamic press.

14. The method of claim 1, further including:
    causing the press to press on the conductor bundle and thereby shape the conductor bundle; and
    causing the press to heat the conductor bundle and thereby cure a resin in the resin-rich mica tape within the heated and dynamic press.

15. A method of fabricating an HVRM conductor, comprising:
    spiral wrapping a conductor bundle with a resin-rich mica tape to form a wrapped bundle;
    placing the wrapped bundle within a sleeve comprising a liquid-impermeable material to form a covered bundle;
    sealing any open end of the sleeve;
    evacuating the sleeve;
    thereafter fully submerging the covered bundle in a vat of primarily water heated to about 60-100° C.; and thereafter placing the conductor bundle in a dynamic press heated to about 130-180° C. to shape the conductor bundle and cure a resin in the resin-rich mica tape.

16. The method of claim 15, further including pressurizing the vat of water after the covered bundle has been fully submerged in the vat of water.

17. The method of claim 16, wherein pressurizing the vat of water includes placing the vat of liquid inside of an autoclave.

18. The method of claim 16, wherein placing the conductor bundle in the press includes placing the conductor bundle in the press after removing the covered bundle from the vat of water and the autoclave and after removing the sleeve from the covered bundle.

19. An HVRM conductor fabricated via the method of claim 1.

20. A method of fabricating an HVRM conductor, comprising:
spiral wrapping a conductor bundle with a resin-rich mica tape to form a wrapped bundle;
placing the wrapped bundle within a sleeve comprising a liquid-impermeable material to form a covered bundle;
sealing any open end of the sleeve;
evacuating the sleeve;
thereafter fully submerging the covered bundle in a vat of primarily water heated to about 60-100° C.;
pressurizing the vat of water in an autoclave after the covered bundle has been fully submerged; and
thereafter placing the conductor bundle in a dynamic press heated to about 130-180° C. to shape the conductor bundle and cure a resin in the resin-rich mica tape.

* * * * *